United States Patent [19]

Communal et al.

[11] 3,912,607

[45] Oct. 14, 1975

[54] PROCESS FOR OBTAINING HIGH MOLECULAR WEIGHT WATER-SOLUBLE ACRYLIC POLYMERS AND COPOLYMERS USING RADIATION

[75] Inventors: Jean Pierre Communal, Nogent-L'Artaud; Jacques Fritz, Champagne au Mont D'Or; Bernard Papillon, La Mulatiere, all of France

[73] Assignee: Rhone-Progil, Courbevoie, France

[22] Filed: June 17, 1974

[21] Appl. No.: 480,303

Related U.S. Application Data

[63] Continuation-in-part of Ser. No. 220,691, Jan. 25, 1972, abandoned, which is a continuation-in-part of Ser. No. 76,603, Sept. 29, 1970, abandoned.

[52] U.S. Cl...... 204/159.23; 260/80 R; 260/80.3 N; 260/80.73; 260/85.5 R; 260/88.7 G; 260/88.7 F; 260/89.5 R; 260/89.7 R; 204/159.24
[51] Int. Cl.² ......................... C08F 2/46; C08F 4/00
[58] Field of Search..... 204/159.22, 159.23, 159.24; 260/88.7 B, 89.7 R, 89.5 A

[56] References Cited

UNITED STATES PATENTS

| | | | |
|---|---|---|---|
| 2,921,006 | 1/1960 | Schmitz et al. | 204/159.15 |
| 3,138,460 | 6/1964 | Levinos | 204/159.23 |

*Primary Examiner*—Richard B. Turer
*Attorney, Agent, or Firm*—Browdy and Neimark

[57] ABSTRACT

A process for obtaining water-soluble acrylic polymers and copolymers by depositing a concentrated aqueous solution of the monomer(s) having a pH of at least 8 and a photopolymerization initiator, onto a substrate, either moving or not, as a continuous layer or as distinct droplets and subjecting the solution to a luminous irradiation for 30 sec.–15 minutes while controlling the temperature of the reaction mixture by cooling.

15 Claims, No Drawings

PROCESS FOR OBTAINING HIGH MOLECULAR WEIGHT WATER-SOLUBLE ACRYLIC POLYMERS AND COPOLYMERS USING RADIATION

This is a continuation-in-part of Ser. No. 220,691 filed Jan. 25, 1972, now abandoned, which in turn was a continuation-in-part of Ser. No. 76,603 filed Sept. 29, 1970, now abandoned, the entire contents of both of which being hereby incorporated by reference.

The present invention relates to a process for obtaining in solid form, thermoplastic, water-soluble acrylic polymers and copolymers, having characteristics suitable for use in the field of flocculating, thickening and sizing agents.

It has long been known to polymerize acrylic monomers in diluted aqueous solution to obtain, in gel form, polymers that must afterwards be dried and ground. However, gel dehydration is a long and expensive operation.

In the special case of polymers having a high solubility in water, obtained from a relatively concentrated monomer solution, the viscosity of which progressively increases during polymerization, it is very difficult to provide sufficient stirring of the reaction mixture and satisfactory removal of the emitted heat. Very substantial difficulties are encountered with a polymerization solution having a percentage of dissolved monomers of about 20% or more. The polymerization is exothermic and heretofore it has not been possible to satisfactorily dissipate the heat of reaction in such concentrated solutions.

A method of polymerization of an aqueous solution containing 30 to 50% of monomers has been described in the French Pat. No. 1,518,053 filed Feb. 21, 1967, which relates to polymerization in a device which allows heat removal and is used as a polymerization reactor. This method has the advantage of suppressing the necessity of stirring the reaction mixture but requires a cooling device in order to remove the heat formed. Polymerization time is very long and the obtained rubbery mass has to be submitted to drying/grinding operations.

The process according to the present invention, on the contrary, provides very quick polymerization avoiding the necessity during polymerization of stirring and of cooling the reaction mixture as described in the above-mentioned prior art. It extends polymerization possibilities to a very concentrated solutions of acrylic monomers, near the saturation point, which lead directly to thermoplastic polymers in the solid state. With monomer concentrations in the polymerization solution of about 70%, it is possible to obtain in a very short time, thermoplastic acrylic polymers or copolymers which, under operative conditions of pH equal to 8 or higher, have a very high hydrosolubility degree.

The process according to the present invention directly provides the acrylic polymer or copolymer in the form of a relatively thin layer or of separate balls or granules. To accomplish this objective, the process consists of depositing in the form of a layer or of distinct droplets onto a convenient substrate, an aqueous solution of the monomer(s) of at least about 60%, containing a photopolymerization promoter, preferably soluble in the monomer or one of the monomers; then of submitting the solution to a luminous irridation of 1500 to 5000 angstroms in order to produce polymerization. This technique provides thermoplastic acrylic polymers and copolymers having a high molecular weight of at least $10^6$.

However, it is possible to obtain acrylic polymers and copolymers of lower mean molecular weight by using an initiator system to reinforce and complete the photopolymerization promotor action. In this event, the start of the polymerization is due to the promotor but the heat build-up then allows the initiator system to become effective and complete the polymerization thus allowing the obtention of compounds having a low molecular weight from about $10^3$ to $10^6$. This effect on the molecular weight can also be further supplemented by the addition of a chain transfer or chain limiting agent such as mercaptans, methanol or other suitable agents.

This process may be put into practice either as a discontinuous or a continuous process because of its great polymerization speed. In the continuous procedure, it is sufficient that the substrate be moving; and the polymerization or copolymerization of acrylic monomer(s) is achieved thereon by passing the monomer coated substrate before a series of lamps producing the luminous irradiation.

Deposit of the monomer solution on the substrate may be achieved by any convenient means. A layer may be obtained in a discontinuous process by directly forming a layer of monomer solution on the substrate, and in a continuous process by continuously feeding the solution onto the substrate, by any convenient means. Droplets may be produced by spraying or by a mechanical, pneumatic or pressure system. Those droplets recovered on the fixed or moving substrate remain separated from one another so as to provide a polymer or copolymer in the form of balls or granules sufficiently small to avoid further grinding.

If the content of residual water in the product is thought too high, it may be subjected to a drying step, for example by passing the polymer into a heated and ventilated tunnel. Then the polymer or copolymer in the dry state is removed from the substrate by scraping. The layer is ground very finely while the granules require no further treatment.

The polymer or copolymer, being thermoplastic and water soluble, may be put very quickly in solution with water, for its further use.

The monomer or comonomer solution necessarily contains before deposit on the substrate, a photo-polymerization promotor preferably soluble in the monomer or in one of the monomers. This may be added to the aqueous solution or it may be first dissolved in the monomer after which the aqueous solution is prepared. The solution obtained may be stored sheltered from light before deposit on the substrate, since the promoter becomes active only during the use of luminous irradiation.

The same is true when an initiator system reinforcing and completing the promotor action is added.

Polymerization total time, although very short, permits obtaining a polymer or copolymer having a molecular mass in the range of $10^3$ to $10^6$ at least. This time of polymerization is generally between 30 seconds and 15 minutes and is preferably about several minutes.

Because of the great adherence of the thermoplastic, water soluble acrylic polymers or copolymers obtained, it is necessary to use a substrate having a surface such that it is easy to scrape off the final products and avoid any sticking of the polymer or copolymer to the fixed or moving substrate. The nature of this substrate may be varied and examples include waterproof substrates such as those of fluorinated polymers or copolymers or polyolefins, metal covered with a waterproof plastic strip or a steel strip. The lower part of the substrate is continuously cooled either by spraying or by constant contact with a water stream. The use of Sandvik belts, well known in the industry, is especially prescribed.

It is particularly important that, whatever be the nature of the substrate, it be cooled as, for example, by contact with water on the lower side thereof. Due to the extreme exothermicity of the polymerization reaction, some reticulation will occur when using such high concentrations even though the reaction solution is in the form of a thin film. Accordingly, although polymerizing from concentrations of 60% in droplets or a thin film will avoid the inevitable explosion which will occur if the same reaction were attempted in bulk, one would still not have a satisfactory product for the purposes of the present invention. That is, the heat evolved in a thin film reaction, although not enough to generate an explosion, would cause some of the monomer to sublimate and thus be wasted and, more importantly, will promote some degree of reticulation by reticulation by imidization, particularly when acrylamide or methacrylamide is present in the monomer solution. The mechanism for such imidization is as follows:

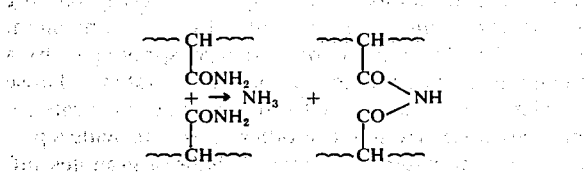

To avoid such imidization the temperature must be controlled. The imidization results in a "popcorn" type polymer as is known in the prior art as, for example, in Chapiro, *High Polymers*, Vol XV, "Radiation Chemistry of Polymeric Systems," 1962, page 328. The presence of even a minor amount of reticulation is undesirable in the products of the present invention as the reticulated portions are insoluble and render the products unsuitable as flocculants or sizing agents. An excellent water-soluble product is made at high concentrations thus eliminating costly drying operations prior to grinding.

The photopolymerization promoters used are of a known type. Among the more active may be mentioned: diacetyl, dibenzoyl, benzophenone and more especially benzoin and its alkyl ethers as for example methyl, ethyl, propyl ethers. The percentage of the promoter depends upon its nature, its activity and upon the distance from the lamps to the substrate. This percentage may vary within large limits, generally between 0.05 and 10% by weight with regard to the monomer(s) used. Moreover, it is possible to add on occasion a classical U.V. ray-absorption regulator. The initiator system reinforcing and completing the promoter action is generally made of azobisisobutyronitrile or a redox catalyst such as persulfate bisulfite type. The addition of this initiator system in small amounts with respect to the monomer(s) from about 0 or to 5% by weight is sufficient.

The wave length of the emitting lamps is chosen in the range of from 1500 to 5000 angstroms, preferably between 3000 and 4000 angstroms. The distance from lamps to the support depends upon their intensity, initiator nature and, in the case of a continuous system, upon the moving substrate speed. The distance of the lamp to the substrate may vary within large limits from about one centimeter to one meter. Good industrial yields of polymers or copolymers are obtained with a distance from 10 to 80 centimeters. Polymerization speed of the acrylic monomer(s) depends upon radiation intensity at a given point.

The wave length of the radiation used is indeed critical for obtaining a high-yield water-soluble polymer product. Wave lengths longer than about 5000 angstroms do not adequately serve to initiate photopolymerization. Wave lengths shorter than about 1500 angstroms have too high radiation energy and cause cross-linking according to the following mechanism:

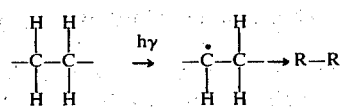

Any kind of cross-linking must be avoided as this renders the product, or portions of the product, insoluble. Accordingly, X-rays, gamma-rays or high energy electrons would not be operable with the present invention as a source of radiation.

The energy, received per surface unit of solution, act upon the polymerization speed of the monomer(s) and the molecular weights of the polymer or copolymer obtained; and in the case of a continuous polymerization, it is interdependent with moving speed and length of the moving substrate.

The use of a photopolymerization promoter or an initiator system soluble in the monomer(s) avoids the use of a solvent which could give rise to secondary reactions with one of the monomers, such secondary reactions being prejudicial to the water solubility of the final polymer or copolymer.

The process according to the invention is applicable to polymerization and copolymerization in aqueous solution of of acrylic derivatives, such as acrylamide, methacrylamide, acrylonitrile, methacrylonitrile, acrylic acid, methacrylic acid, and salts and esters of acrylic and methacrylic acids. It should be understood, however, that a water-soluble product is desired and therefore the monomers or comonomers must be selected such that the resulting polymer is water-soluble. For example, when acrylonitrile or methacrylonitrile is used, which form water-insoluble polymers, they must be in combination with other monomers and in proportions such that the final product is water-soluble (See Examples 4, 5, 6 and 8). The monomer or comonomer solutions are very concentrated, being of at least 60% and preferably at least 70%. It is, of course, important that the monomers be in solution. Accordingly, insoluble monomers may be made soluble in known manners, such as by quaternization, oxyethylation, etc. As is also known, quaternization or other known procedures, may be used to enhance the polymerizability of certain acrylic or methacrylic acid ester monomers. The pH of these solutions, to obtain polymers or copolymers presenting a very marked hydrosolubility character, must be at least 8 and preferably from 8 to 13. With regard to these conditions, it is better to work with demineralized water. The polymerization may be carried out in a substantially oxygen-free atmosphere, as is known, obtained, for example, by passing an inert gas such as nitrogen through the monomer solution and above the coated substrate.

The acrylic polymers and copolymers obtained in this way because of their convenient molecular weight and their great water-solubility have very interesting characteristics for industrial applications. They are usable successfully in the field of flocculating and thickening agents. They are especially good for water treatment.

The higher molecular weight products of the present invention have particular utility as flocculating agents. Due to the substantially complete polymerization and absence of costly drying steps necessary in prior art methods of producing such polymers, the present process is approximately 30% less expensive than such known processes currently being used in industry.

The products made by the present invention materially enhance the quality of the environment of mankind by contributing to the restoration or maintenance of pure water. When used as a flocculating agent in industrial processes, the polymers of the present invention will not foul the water due to their solubility. Also, they are particularly useful in clarifying water due to their outstanding flocculating action. Furthermore, since the polymerization proceeds to substantially 100% completion, there is no residual monomer left in the product. This is very important because the monomers are usually toxic for fish and humans. The product of Example 9 is of particular interest as a flocculating agent.

The lower molecular weight polymers made by the present process may be used as sizing agents. In this utility, it is also particularly important that any reticulation or cross-linking be eliminated as such insoluble portions render the product adhesive which will cause problems in the loom.

The following examples are given in a non-limitative way.

EXAMPLE 1

The following aqueous solution is made:

| | | |
|---|---|---|
| acrylamide | 54 | grams |
| NaOH aqueous solution (10N) | 0.5 | ml. |
| benzoin ethyl ether | 30 | mg. in soln. in 0.2 gr. of acrylonitrile |
| water | 23 | grams |
| pH is 10.9 | | |

This solution is then poured onto a fixed strip made of stainless steel covered with polytetrafluorethylene to form in this way a uniform layer 3mm. thick. The coated strip is submitted to a luminous irradiation by means of Philipps lamps HTQ4 of 1 kw. (mercury vapor lamps, emitting rays corresponding to a pressure of 40 mm. Hg.). The distance from the strip to the luminous source is 35 cm. Radiation time is 2 minutes. The temperature is controlled such that the maximum temperature measured inside the layer is 118° C. Then this layer, separated from the strip by scraping, is ground.

The thermoplastic polymer obtained has an excellent water solubility. Viscosimetric molecular mass is $2.6 \times 10^6$ corresponding to an intrinsic viscosity of 4.8.

EXAMPLE 2

The following aqueous solution is made:

| | | |
|---|---|---|
| acrylamide | 54 | grams |
| acrylic acid | 6 | grams |
| NaOH aqueous solution (10 N) | 8.5 | ml. |
| benzoin methyl ether | 30 | mg. in soln. with acrylic acid |
| water | 21 | grams |
| pH is 10.4 | | |

This aqueous solution is fed onto a polyethylene moving substrate so as to give a layer 0.5 cm. thick. It is submitted to a luminous irradiation by means of Philipps lamps HPS 125 watts (wave length between 3000 and 3500 A). The distance from the substrate to the luminous source is 12 cm.

Irradiation time is 1 minute 21 sec. The temperature is controlled such that the maximum temperature measured inside the layer is 137° C. The copolymer layer in the solid state is separated from the substrate by scraping and is afterwards easily ground.

The obtained copolymer has an excellent water solubility. Viscosimetric molecular mass is $4.3 \times 10^6$ corresponding to an intrinsic viscosity of 6.6.

EXAMPLE 3

The follow aqueous solution is made:

| | | |
|---|---|---|
| acrylamide | 54 | grams |
| acrylic acid | 6 | grams |
| NaOH aqueous soln. (10N) | 9 | ml. |
| benzoin ethyl ether | 30 | grams dissolved in acrylic acid |
| water | 21 | grams |
| pH is 10.4 | | |

This solution is projected by spraying in the form of distinct droplets onto a polytetrafluorethylene moving substrate, which is submitted to a luminous irradiation by means of Philipps lamps HPS 125 watts. The distance from the substrate to luminous source is 12 cm. Radiation time is 1 min. 39 sec. The temperature is controlled so that the maximum temperature of the droplets is 149° C. The droplets obtained are removed from the substrate by scraping.

The copolymer has a very good water solubility. Viscosimetric molecular mass is $3.1 \times 10^6$ corresponding to an intrinsic viscosity of 5.4.

EXAMPLE 4

The following aqueous solution is made:

| | | |
|---|---|---|
| acrylamide | 56.4 | g. |
| acrylic acid | 3.6 | g. |
| acrylonitrile | 0.65 | |
| NaOH aqueous soln. (10N) | 5.55 | ml. |
| benzoin ethyl ether | 17.0 | mg. dissolved in acrylonitrile |
| Water | 21.0 | g. |
| pH is 10.1 | | |

This solution is poured onto a fixed substrate made of stainless steel covered with polytetrafluorethylene, so as to give a layer 1.5 cm. thick. It is submitted to luminous irradiation by means of Philipps lamps HPS 125 watts. The distance between the substrate and the lamps is 13 cm. and irradiation time is 4 min. The temperature is controlled so that the maximum temperature in the layer is 149° C.

The copolymer, obtained in the solid state is ground. Its water-solubility is very good. Its viscosimetric molecular mass is $3.14 \times 10^6$ corresponding to an intrinsic viscosity of 5.40.

EXAMPLE 5

The process of EXAMPLE 4 is repeated but methacrylonitrile is substituted for acrylonitrile and the irradiation time is 7 minutes.

The copolymer has a viscosimetric molecular mass of $2.08 \times 10^6$ which corresponds to an intrinsic viscosity of 4.15.

EXAMPLE 6

The following aqueous solution is made:

| | | |
|---|---|---|
| acrylamide | 18 | g. |
| acrylonitrile | 13 | g. |
| water | 10.3 | g. |
| methyl alcohol | 2 | g. |
| benzoin propyl ether | 32 | mg. dissolved in 0.2 g. acrylonitrile |
| azobisisobutyronitrile | 54 | mg. |
| triethanolamine | 1.2 | g. |
| ammonia (30%) | 1.9 | g. |

The solution is then poured onto a moving substrate made of stainless steel cooled on its lower surface. This solution forms a uniform layer 5 mm thick. The coated strip is submitted to a luminous irradiation by means of Philipps lamps HTQ 4 of 1 kw. The distance from the strip to the luminous source is 30 cm. Radiation time is 1 min. The maximum temperature measured from the inside of the layer of copolymers is 115° C. The polymerization is continued several minutes. The layer of copolymers, separated from the substrate is then ground. A solution of 5.6% in water gives a viscosity at 20° C. of 27 centipoises, which corresponds to a viscosimetric molecular mass of $10^4$.

EXAMPLE 7

The following aqueous solution is made up:

| | | |
|---|---|---|
| acrylamide | 18 | kg. |
| acrylic acid | 1.26 | kg. |
| water | 10.2 | kg. |
| methyl alcohol | 1.8 | kg. |
| benzoin propyl ether | 70 | g. |
| azobisisobutyronitrile | 90 | g. |
| triethanolamine | 0.6 | kg. |
| ammonia (30%) | 1.9 | kg. |

The solution is supplied onto a Sandvik moving strip of stainless steel, cooled on its lower surface to form a uniform layer 5 mm thick. This is submitted to a luminous irradiation means of Philipps lamps HPS of 125 watts. The distance from the strip to the luminous source is 15 cm.

The duration of the radiation is 1 min. 40 sec. The maximum temperature measured at the interior of the layer of copolymer is 130° C. The polymerization is continued for several minutes without irradiation then the layer is separated from the strip by scraping at the end of the run. The copolymer obtained is easily ground. It has a viscosity of 1000 centipoises in 10% water, which corresponds to approximately a viscosimetric molecular mass on the order of $10^5$.

EXAMPLE 8

The following aqueous solution is made up:

| | |
|---|---|
| acrylamide | 18 kg. |
| acrylic acid | 2.3 kg. |
| acrylonitrile | 13 kg. |
| water | 10.3 kg. |
| methyl alcohol | 2 kg. |
| benzoin propyl ether | 32 g. (mixed in 500 g. of acrylic acid) |
| azobisisobutyronitrile | 54 g. (mixed in 500 g. of acrylic acid) |
| triethanolamine | 1.2 kg. |
| ammonia (30%) | 1.9 kg. |

The solution is projected by spraying in the form of distinct droplets onto a moving belt made up of either a Sandvik band of cooled stainless steel, or a belt of polytetrafluorethylene. This is subjected to a luminous irradiation by means of Philipps lamps HPS of 125 watts.

The distance from the substrate to the luminous source is 12 cm. The irradiation time is 1 min. 30 sec. The maximum temperature of the droplets is 125° C. The droplets obtained are removed from the band by scraping at the end of the run.

The copolymer obtained has a good solubility in water, having a viscosimetric molecular mass of about $5-10^4$.

EXAMPLE 9

This example illustrates the process of the present invention using as monomer an ester of methacrylic acid.

The following aqueous solution is made:

| | |
|---|---|
| dimethylaminoethyl methacrylate, quaternized with methyl chloride | 80 g. |
| water | 20 g. |
| benzoin methyl ether | 30 mg. |

This solution is poured onto a moving stainless steel belt previously spray-coated with polytetrafluoroethylene. It is cooled by spraying the lower side of the belt with water. The poured solution, in the form of a uniform layer 5 mm. thick, is subjected to luminous radiation by means of Philipps lamps HTQ4 of 1 kw (mercury vapor lamps, emitting rays corresponding to a pressure of 40 mm. Hg). The distance from the strip to the luminous source is 30 cm. and the irradiation time is 10 minutes. The maximum temperature measured at the interior of the layer is 80° C. The resulting layer, obtained in the solid state, is then separated from the strip and ground.

The thermoplastic polymer obtained is 100% soluble in water and has a viscosimetric molecular mass on the order of $3.0 \times 10^6$.

In all of the above examples at least 99.8% of the monomer was polymerized.

It will be obvious to those skilled in the art that various changes may be made without departing from the scope of the invention and the invention is not to be considered limited to what is described in the specification.

What is claimed is:

1. A process for obtaining, in solid state, thermoplastic water-soluble acrylic polymers and copolymers, comprising the steps of:
    depositing onto a substrate as a thin layer of at least about 3 mm or in the form of distinct droplets an aqueous solution of at least 60% by weight of acrylic monomer or monomers selected from the group consisting of acrylamide, methacrylamide, acrylonitrile, methacrylonitrile, acrylic acid, methacrylic acid, and salts and esters of acrylic acid and methacrylic acid, said monomer or monomers being selected such that the resulting polymer or copolymer is water-soluble, said solution having a pH of at least 8 and containing a photopolymerization promoter in a percentage between 0.05 and 10% by weight of monomer;

subjecting said solution to a luminous irradiation having a wave length chosen in the range from 1500 to 5000 angstroms;

simultaneous with said subjecting step, controlling the temperature of the reaction mixture to below 149°C by cooling; and removing from said substrate the polymers and copolymers formed after irradiation.

2. A process according to claim 1 wherein a polymerization initiator is added to complete and reinforce the action of the photopolymerization promoter, the percentage of this polymerization initiator being between 0 and 5% by weight of monomer.

3. A process according to claim 1 wherein said process is continuous and said substrate is moving.

4. A process according to claim 1 wherein said solution is deposited onto said substrate in the form of distinct droplets.

5. A process according to claim 1 wherein said solution is deposited onto said substrate as a thin layer, and after irradiation said layer is removed from said substrate by scraping and is then ground.

6. A process according to claim 1 wherein said pH is between 8 and 13.

7. A process according to claim 1 wherein said irradiation time is 30 sec.–15 minutes.

8. A process according to claim 1 wherein said photopolymerization promoter is a benzoin alkyl ether.

9. A process according to claim 2 wherein said polymerization initiator is the azobisisobutyronitrile.

10. A process according to claim 2 wherein said polymerization initiator is a redox system persulphate bisulfite.

11. A process according to claim 2 wherein the action of the polymerization initiator is reinforced by addition of chain transfer agent or chain limitation agent.

12. A process according to claim 1 wherein said substrate is a steel strip and said temperature controlling step comprising cooling said steel strip.

13. A process in accordance with claim 12 wherein said step of cooling said steel strip comprises contacting the lower part of the strip with water.

14. A process in accordance with claim 13 wherein said contacting comprises spraying.

15. A process in accordance with claim 1 wherein said aqueous monomer solution concentration is at least 70%.

* * * * *

UNITED STATES PATENT OFFICE
CERTIFICATE OF CORRECTION

PATENT NO. : 3,912,607
DATED : October 14, 1975
INVENTOR(S) : COMMUNAL et al

It is certified that error appears in the above—identified patent and that said Letters Patent are hereby corrected as shown below:

[30] Foreign Application Priority Data

October 22, 1969 France ....... 69.36685

Signed and Sealed this seventeenth Day of February 1976

[SEAL]

Attest:

RUTH C. MASON
*Attesting Officer*

C. MARSHALL DANN
*Commissioner of Patents and Trademarks*